(12) United States Patent
Chen et al.

(10) Patent No.: US 12,025,429 B2
(45) Date of Patent: Jul. 2, 2024

(54) OPTICAL IMAGING SYSTEM AND IMAGING METHOD REGULATED BASED ON SPATIAL COHERENCE STRUCTURE

(71) Applicant: SOOCHOW UNIVERSITY, Suzhou (CN)

(72) Inventors: Yahong Chen, Suzhou (CN); Deming Peng, Suzhou (CN); Yuechen Shen, Suzhou (CN); Hu Sun, Suzhou (CN); Fei Wang, Suzhou (CN); Yangjian Cai, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 304 days.

(21) Appl. No.: 17/764,266

(22) PCT Filed: Feb. 20, 2021

(86) PCT No.: PCT/CN2021/077102
§ 371 (c)(1),
(2) Date: Mar. 28, 2022

(87) PCT Pub. No.: WO2022/134295
PCT Pub. Date: Jun. 30, 2022

(65) Prior Publication Data
US 2023/0175837 A1    Jun. 8, 2023

(30) Foreign Application Priority Data
Dec. 21, 2020 (CN) .......................... 202011515882.7

(51) Int. Cl.
*G01B 11/24* (2006.01)
(52) U.S. Cl.
CPC .................................. *G01B 11/24* (2013.01)

(58) Field of Classification Search
CPC .... G01B 11/24; G01B 11/2441; G02B 27/50; G02B 27/0025; G02B 26/06; G02B 27/48
(Continued)

(56) References Cited

U.S. PATENT DOCUMENTS

| 6,088,321 A * | 7/2000 | Yamaji | G11C 13/042 |
| | | | 369/103 |
| 6,272,095 B1 * | 8/2001 | Liu | G11B 7/1381 |
| | | | 369/112.01 |

(Continued)

FOREIGN PATENT DOCUMENTS

| CN | 102707365 A | 10/2012 |
| CN | 102865832 A | 1/2013 |

(Continued)

*Primary Examiner* — Isiaka O Akanbi
(74) *Attorney, Agent, or Firm* — SZDC Law PC (57) ABSTRACT

The invention discloses an optical imaging system and an imaging method regulated based on a spatial coherence structure, including the steps of: building a 4f imaging system; detecting, by a first optical detector, the shape of the spectrum domain obstacle in the 4f imaging system; designing a spatial coherence structure of the incident beam based on the shape of the spectrum domain obstacle, so that all the modes of the incident beam can pass through the opening in the obstacle; and placing an object to be detected in the optical path and detecting, by the second optical detector, the optical imaging information of the object to be detected. According to the present invention, in the case where the frequency plane of the 4f optical imaging system is partially occluded, imaging without speckles is enabled, utilization of the systematic light is substantially improved, and the signal-to-noise ratio in imaging is improved.

10 Claims, 2 Drawing Sheets

(58) Field of Classification Search
USPC .................. 356/601, 401, 479, 484, 451
See application file for complete search history.

(56) References Cited

U.S. PATENT DOCUMENTS

| | | | |
|---|---|---|---|
| 6,538,817 | B1 | 3/2003 | Farmer et al. |
| 8,014,255 | B2* | 9/2011 | Kawano ............... G11B 7/1395 |
| | | | 369/103 |
| 2002/0122254 | A1* | 9/2002 | Gluckstad ............. G02B 27/46 |
| | | | 359/276 |
| 2009/0073456 | A1* | 3/2009 | Wax .................... G01B 9/0209 |
| | | | 356/479 |
| 2009/0177094 | A1* | 7/2009 | Brown ................. A61B 5/0066 |
| | | | 606/2 |
| 2009/0225641 | A1* | 9/2009 | Sugita .................... G03H 1/265 |
| 2013/0135614 | A1* | 5/2013 | Wax ........................ G01J 3/453 |
| | | | 356/451 |
| 2016/0209646 | A1* | 7/2016 | Hattori .................. G02B 21/02 |
| 2016/0320598 | A1 | 11/2016 | Dubois |

FOREIGN PATENT DOCUMENTS

| | | |
|---|---|---|
| CN | 104871064 A | 8/2015 |
| CN | 106646895 A | 5/2017 |
| CN | 107024763 A | 8/2017 |
| CN | 108873323 A | 11/2018 |
| CN | 112304246 A | 2/2021 |

\* cited by examiner

OPTICAL IMAGING SYSTEM AND IMAGING METHOD REGULATED BASED ON SPATIAL COHERENCE STRUCTURE

This application is the National Stage Application of PCT/CN2021/077102, filed on Feb. 20, 2021, which claims priority to Chinese Patent Application No. 202011515882.7, filed on Dec. 21, 2020, which is incorporated by reference for all purposes as if fully set forth herein.

FIELD OF THE INVENTION

The present invention relates to the field of optical technology, and more particularly to an optical imaging system and imaging method regulated based on a spatial coherence structure.

DESCRIPTION OF THE RELATED ART

Optical imaging is a process of transforming an objective object into an image by light and is an essential way to obtain information. It is closely related to life, for example, it may be applied to glasses, cameras, projectors, telescopes or the like. Nowadays, optical imaging is being more and more widely used in various fields of modern scientific research, especially in the fields of biomedicine and optical physics. In biological and medical research, optical imaging has become an important means for in-depth study of the individual behavior of living cells and biological macromolecules, and for exploration of the law of life movement. It can be used to observe individual living cells and even organelles in cells, so as to assist the manipulation of cells and their organelles. In the research of optical physics, the traditional imaging methods mainly include a 2f imaging system and a 4f imaging system. In optics, in both 2f imaging system and 4f imaging system, imaging is performed through lenses. There are two types of lenses, convex lenses and concave lenses, which are classified depending on their different effects on light. In practice, convex lenses are more widely studied and applied than concave lenses. The imaging law thereof is also rather simple: if an object is placed out of focus, it becomes an inverted real image on the other side of the convex lens, and the real image has a reduced, equal or magnified size. The smaller the object distance, the larger the image distance and the larger the real image. Particularly, when the object distance and the image distance are both twice the focal length, an inverted real image of an equal size is produced, in which case it is a 2f imaging system. If the object is placed in focus, an upright magnified virtual image is produced on the same side of the convex lens. The larger the object distance, the larger the image distance and the larger the virtual image. On the other hand, a 4f imaging system contains two strict Fourier transform processes, which enables researchers to analyze and process the spectrum of optical information. A specific filter is added in the frequency plane to cut off the information of certain frequencies, or introduce certain phase transform into certain specific frequencies, so as to meet the demands, obtain corresponding information, modify the image structure and obtain the required image.

With the development of science and technology, the research on optical imaging is becoming increasingly deeper, and the requirements for optical imaging technology are getting increasingly higher. The traditional 4f imaging system is extremely demanding. When its frequency plane is partially occluded by an external obstacle, the imaging quality of the output plane will be seriously affected. Therefore, it is particularly important as to how to effectively overcome external interference and achieve high-quality imaging in the optical imaging system.

At present, the most widely used optical imaging system is 4f imaging system. Usually, it consists of a pair of coaxial and confocal thin lenses with the same focal length, and includes three special surfaces: an input plane, a frequency plane and an output plane. Its input plane is located in the front focal plane of the first lens. The frequency plane of the system, that is, the frequency domain, is located in the back focal plane of the first lens, which is also the front focal plane of the second lens. The output plane of the system is located in the back focal plane of the second lens, and outputs the image thus formed, which is an input image of equal size that is symmetrical about the origin. If the focal lengths of the two lenses are not equal, the image output on the imaging plane is only laterally magnified or reduced by M times, where M is the lateral magnification depending on the ratio of focal lengths of the rear lens to the front lens.

At present, researchers mainly use completely coherent or incoherent illumination 4f imaging systems, among which 4f imaging system with completely coherent illumination has important applications in optical signal processing and frequency filtering. However, when completely coherent light is used as the light source of the 4f imaging system, due to the high coherence of the completely coherent light, there will be many imaging speckles, and when the frequency plane is partially occluded, the imaging will be distorted. The 4f imaging system with incoherent illumination has important applications in microscopic imaging. Although use of incoherent light as the light source of the 4f imaging system can prevent speckles, when the frequency plane is occluded, the light utilization rate of the system is low, resulting in weak imaging intensity, high imaging noise and low signal-to-noise ratio of the image.

SUMMARY OF THE INVENTION

The present invention aims to provide an optical imaging system and imaging method regulated based on a spatial coherence structure that enables imaging without speckles in the case where the frequency plane of a 4f optical imaging system is partially occluded, thereby substantially improving utilization of the systematic light as well improving the signal-to-noise ratio in imaging.

To address this technical problem, the present invention provides an optical imaging system regulated based on a spatial coherence structure, including:

a light source assembly including a laser and a first beam split element, the first beam split element splitting a beam emitted from the laser into a first beam and a second beam;

an obstacle optical assembly including a first lens and a second lens, the first lens being positioned at the front side of an obstacle and the second lens being positioned at the back side of the obstacle, in which the first lens and the second lens form a 4f imaging system;

an adjustable optical assembly positioned at the front side of an object to be detected, the adjustable optical assembly including a first shading element and a spatial light modulator that are sequentially arranged, the first beam passing through the first shading element and the spatial light modulator and then entering the obstacle optical assembly;

a front optical assembly including a second shading element and a third lens, the second beam passing sequentially through the second shading element and the third lens and then entering the obstacle optical assembly, the third lens and the first lens forming a 4f imaging system;

a first optical detection assembly configured to detect optical imaging information of the obstacle and positioned in an image space of the obstacle optical assembly, the first optical detection assembly including a fourth lens and a first optical detector, the fourth lens being positioned at the front side of the first optical detector, the second lens and the fourth lens forming a 4f imaging system;

a second optical detection assembly configured to detect optical imaging information of the object to be detected and positioned in an image space of the obstacle optical assembly, the second optical detection assembly including a second optical detector; and a computer connected to the first optical detector and the spatial light modulator, the first optical detector sending the optical information of the obstacle to the computer which, based on the optical information of the obstacle, adjusts the spatial light modulator to allow the second beam to pass through an opening of the obstacle.

Preferably, the first optical detector and/or the second optical detector is a beam profiler.

Preferably, the first shading element and/or the second shading element is a light diaphragm.

Preferably, the light source assembly further includes a beam expander positioned between the laser and the first beam split element.

Preferably, the first beam split element is a first beam splitter.

Preferably, the optical imaging system further includes a second beam splitter positioned between the object to be detected and the first lens. A beam exiting the third lens is reflected by the second beam splitter and enters the obstacle optical assembly.

Preferably, a third beam splitter is provided at a rear end of the second lens. The second optical detector is positioned on a first illuminating surface of the third beam splitter and the fourth lens is positioned on a second illuminating surface of the third beam splitter.

Preferably, the light emitted from the laser is completely coherent linearly polarized light.

The present invention further provides an optical imaging method regulated based on a spatial coherence structure, using the optical imaging system described above, including the steps of:

S1: allowing the first shading element in a shading status and the second shading element in an opened status, and detecting, by the first optical detector, the light intensity image distribution $I(\iota_2)$ of the spectrum domain obstacle, where $\iota_2$ is the coordinate of any point in the output plane;

S2: acquiring the light intensity image distribution $I(\iota_2)$ of the spectrum domain obstacle and designing a spatial distribution in a function $p(v)$, which is Fourier transform relationship, of the spatial coherence structure of the incident light by the computer; in which the shape of the opening of the obstacle is obtained based on the light intensity image distribution $I(\iota_2)$ of the spectrum domain obstacle, and the function $p(v)$ is modified based on the shape of the opening of the obstacle so that all modes of the incident beam can pass through the opening of the obstacle, $p(V)$ being a non-negative function of any vector $v \equiv (v_x, v_y)$;

S3: obtaining cross spectral density $W(r_1, r_2)$ of the incident light based on the function $p(v)$ and consequently obtaining a light field $T_{mm}(r, \varphi)$ loaded by the spatial light modulator, where $r \equiv (x, y)$ represents any position vector in the source plane, $r_1 \equiv (x_1, y_1)$ and $r_2 \equiv (x_2, y_2)$ are the position vectors of any two points in the source plane, and $\varphi$ represents a random phase having a value in the range of $[0, 2\pi]$; and S4: allowing the second shading element in a shading status and the first shading element in an opened status, and acquiring, by the second optical detector, the light intensity image distribution information $I_{mn}^{image}(p)$ of the object to be detected.

The present invention further provides an optical imaging method regulated based on a spatial coherence structure, including the steps of:

building a 4f imaging system, in which an obstacle is positioned on a spectrum plane of the 4f imaging system so that the spectrum plane of the 4f imaging system is partially occluded, an opening being provided in the obstacle and extending through the obstacle;

detecting, by a first optical detector, the shape of the spectrum domain obstacle in the 4f imaging system;

designing a spatial coherence structure of the incident beam based on the shape of the spectrum domain obstacle in the 4f imaging system, so that all the modes of the incident beam can pass through the opening of the obstacle; and placing an object to be detected in the optical path and detecting, by the second optical detector, the optical imaging information of the object to be detected.

The present invention has the following beneficial effects.

1. According to the present invention, it can be detected whether an obstacle is included in the frequency domain of the 4f imaging system and the shape of the obstacle can be measured.

2. In the case where the spectrum plane of the 4f optical imaging system is partially occluded, according to the present invention, the coherent structure of the incident light is designed so that the 4f optical imaging system where the frequency domain is partially occluded has robustness, imaging without speckles is enabled, utilization of the systematic light is substantially improved, and the signal-to-noise ratio in imaging is improved.

REFERENCE NUMBERS IN THE DRAWINGS 1. laser; 2. beam expander; 3. first beam split element; 4. first shading element; 5. first reflecting mirror; 6. second shading element; 7. third lens; 8. second reflecting mirror; 9. second beam splitter; 10. first lens; 11. obstacle; 12. second lens; 13. third beam splitter; 14. third reflecting mirror; 15. fourth lens; 16. first optical detector; 17. computer; 18. spatial light modulator; 19. object to be detected; 20. second optical detector.

DETAILED DESCRIPTION OF THE PREFERRED EMBODIMENTS

The present invention will be further described with reference to the drawings and particular embodiments, so that those skilled in the art can better understand and implement the present invention, but the listed embodiments are not intended as limitations of the present invention.

Figure 1:
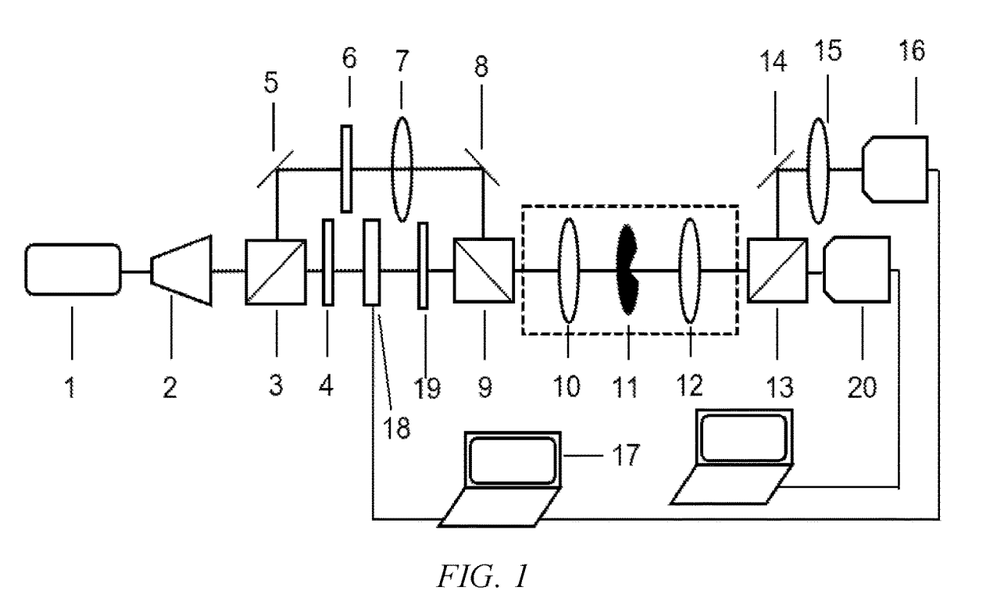
FIG. 1 shows the optical path of the present invention.

With reference to FIG. 1, the present invention discloses an optical imaging system regulated based on a spatial coherence structure, including a light source assembly, an obstacle optical assembly, an adjustable optical assembly, a front optical assembly, a first optical detection assembly, a second optical detection assembly and a computer 17.

The light source assembly includes a laser 1 and a first beam split element 3. The first beam split element 3 splits a beam emitted from the laser 1 into a first beam and a second beam.

The obstacle optical assembly includes a first lens 10 and a second lens 12. The first lens 10 is positioned at a front side of the obstacle 11 and the second lens 12 is positioned at a back side of the obstacle 11. The first lens 10 and the second lens 12 form a 4f imaging system.

The adjustable optical assembly is positioned at a front side of the object to be detected 19. The adjustable optical assembly includes a first shading element 4 and a spatial light modulator 18 that are sequentially arranged. The first beam passes through the first shading element 4 and the spatial light modulator 18 before entering the obstacle optical assembly.

The front optical assembly includes a second shading element 6 and a third lens 7. The second beam passes sequentially through the second shading element 6 and the third lens 7 before entering the obstacle optical assembly. The third lens 7 and the first lens 10 form a 4f imaging system.

The first optical detection assembly is configured to detect optical imaging information of the obstacle 11. The first optical detection assembly is positioned in an image space of the obstacle optical assembly. The first optical detection assembly includes a fourth lens 15 and a first optical detector 16. The fourth lens 15 is positioned at a front side of the first optical detector 16. The second lens 12 and the fourth lens 15 form a 4f imaging system.

The second optical detection assembly is configured to detect optical imaging information of the object to be detected. The second optical detection assembly is positioned in an image space of the obstacle optical assembly. The second optical detection assembly includes a second optical detector 20.

The computer 17 is connected to the first optical detector 16 and the spatial light modulator 18. The first optical detector 16 sends the optical information of the obstacle 11 to the computer 17. The computer 17 adjusts the spatial light modulator 18 based on the optical information of the obstacle 11, so that the second beam can pass through the opening in the obstacle 11.

The first optical detector 16 and/or the second optical detector 20 is a beam profiler. The first shading element 4 and/or the second shading element 6 may be a light diaphragm. The light diaphragm can be opened or closed to shade the light or let it through.

In the present invention, the light source assembly further includes a beam expander 2 positioned between the laser 1 and the first beam split element 3. The beam expander 2 can expand the light beam emitted from the laser 1. The first beam split element 3 is a first beam splitter.

The present invention further includes a second beam splitter 9 positioned between the object to be detected 19 and the first lens 10. The beam exiting the third lens 7 is reflected by the second beam splitter 9 and enters the obstacle optical assembly. A third beam splitter 13 is provided at a back side of the second lens 12. The second optical detector 20 is positioned at a first illuminating surface of the third beam splitter 13, and the fourth lens 15 is positioned at a second illuminating surface of the third beam splitter 13. The light emitted from the laser 1 is completely coherent linearly polarized light.

As shown in FIG. 1, the present invention further includes a first reflecting mirror 5, a second reflecting mirror 8 and a third reflecting mirror 14. The operating principle is as follows. The laser 1 generates a completely coherent linearly polarized light beam, which is expanded by an optical expander 2 while being adjusted into a plane wave. Then the beam is split by the first beam split element 3 into two beams. First the lower beam is occluded by the first shading element 4, and the direction of the upper beam is adjusted by means of the first reflecting mirror 5. The second shading element 6 is opened to let the beam completely pass through. The beam passes through the third lens 7 having the same focal length as the lens 10 in the 4f imaging system (consisting of the first lens 10, the obstacle 11 and the second lens 12), and then the direction of the beam is adjusted by means of the second reflecting mirror 8 and the second beam splitter 9, so that the beam can be incident into the 4f imaging system (i.e., the obstacle optical assembly). The two lenses in this system have the same focal length. The position of the third lens 7 is adjusted in such a manner that the distance between the first lens 10 and the third lens 7 is equal to the sum of the local length of the first lens 10 and the local length of the third lens 7. In this way, the third lens 7 and the first lens 10 form a new 4f imaging system. Its output light field passes through the partially occluding opaque obstacle 11 at the back focal plane of the first lens 10 to obtain a beam of the same shape as that of the opening in the partially occluding obstacle. The beam passes through the second lens 12 in the 4f imaging system, and is split by the third beam splitter 13 into two beams. The propagation direction of the upper beam is adjusted by the third reflecting mirror 14. Then the beam passes through the fourth lens 15 having the same focal length as the second lens 12 in the 4f imaging system. The fourth lens 15 is moved so that the distance between the fourth lens 15 and the second lens 12 is equal to the sum of the focal length of the fourth lens 15 and the focal length of the second lens 12. In this way, the second lens 12 and the fourth lens 15 also form a new 4f imaging system. The beam passes through this system. The output light intensity distribution information is recorded at the back focal plane of the fourth lens 15 by the first optical detector 16, that is the shape of the opening in the obstacle that is symmetrical about the origin.

The shape of the opening in the obstacle is obtained by the method described above, and this information is fed back to the computer 17 which designs the coherent structure of the appropriate incident beam accordingly. The second shading element 6 is used for shading, and the first shading element 4 is completely opened. The designed spatial coherence structure is loaded by the spatial light modulator 18 to obtain a suitable shape of partially coherent light, which is the light source. The beam impinges on the object to be detected 19, and then is incident into the 4f imaging system by the second beam splitter 9. The distance between the object to be detected and the lens 10 is the focal length of the lens 10. Likewise, the beam passes through the partially occluding obstacle 11 and the second lens 12 and the third beam splitter 13. A second optical detector 20 is placed in the imaging plane (i.e., the back focal plane of the second lens 12) to record the light intensity distribution information of the output field. The obtained information is the shape information of the object to be detected 19.

Figure 2:
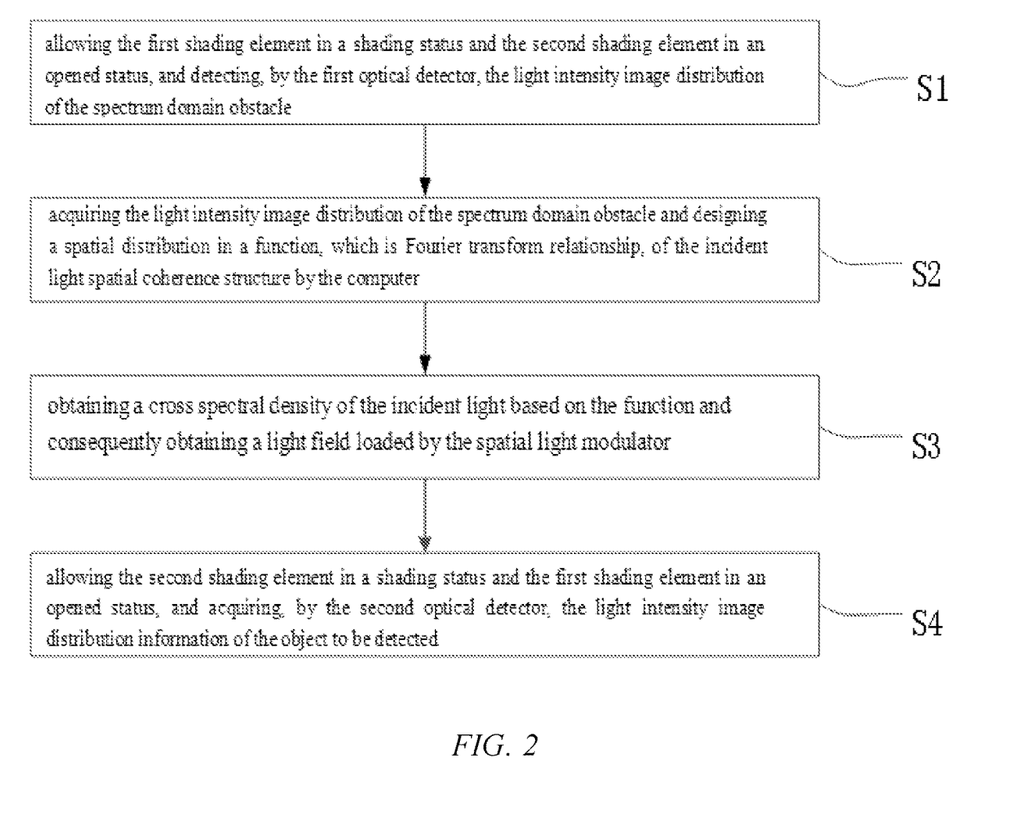
FIG. 2 is flowchart of an optical imaging method regulated based on a spatial coherence structure.

As shown in FIG. 2, the present invention discloses an optical imaging method regulated based on a spatial coherence structure, using the optical imaging system described above. This method includes the following steps.

S1: allowing the first shading element 4 in a shading status and the second shading element 6 in an opened status, and detecting, by the first optical detector 16, the light intensity image distribution $I(\iota_2)$ of the spectrum domain obstacle, where $\iota_2$ is the coordinate of any point in the output plane.

In the present invention, the light intensity distribution information photographed by the first detector is a picture. The computer reads the picture. This picture is a matrix. Each pixel corresponds to a matrix element. The stronger the light intensity, the greater the numeric value of the corresponding matrix element. The numeric value is 0 at a place where the light intensity is zero. The light intensity distribution $I(\iota_2)$ is the shape information of the partially occluding obstacle.

S2: acquiring the light intensity image distribution $I(\iota_2)$ of the spectrum domain obstacle and designing a spatial distribution in a function $p(v)$, which is Fourier transform relationship, of the spatial coherence structure of the incident light by the computer 17; in which the shape of an opening in the obstacle is obtained based on the light intensity image distribution $I(\iota_2)$ of the spectrum domain obstacle, and the function $p(v)$ is modified based on the shape of the opening in the obstacle so that all modes of the incident beam can pass through the opening in the obstacle, $p(v)$ being a non-negative function of any vector $V \equiv (v_x, v_y)$.

In the present invention, the computer reads the intensity distribution information $I(\iota_2)$ of the output plane. The stronger the light intensity, the greater the corresponding numeric value. The numeric value is 0 at a place where the light intensity is zero. The non-zero region is the opening in the obstacle and the zero region is the occluding portion of the obstacle. Spatial distribution in a function $p(v)$, which is Fourier transform relationship, of the spatial coherence structure of the incident light is designed. The shape information $I(\iota_2)$ of the partially occluding obstacle is modified to obtain the $p(v)$ function. As for the matrix elements $I(\iota_2)$, the matrix element adjacent to zero is set to zero (this operation needs to be repeated multiple times to achieve better effects), and the resultant matrix is $p(v)$. In this way, all the modes of the incident beam can pass through the opening in the obstacle.

S3: obtaining cross spectral density $W(r_1, r_2)$ of the incident light based on the function $p(v)$ and consequently obtaining a light field $T_{mn}(r, \varphi)$ loaded by the spatial light modulator 18, where $r \equiv (x, y)$ represents any position vector in the source plane, $r_1 \equiv (x_1, y_1)$ and $r_2 \equiv (x_2, y_2)$ are the position vectors of any two points in the source plane, and $\varphi$ represents a random phase having a value in the range of $[0, 2\pi]$. In the present invention, the spatial light modulator may be of the model BQ-SLM1024.

S4: allowing the second shading element 6 in a shading status and the first shading element 4 in an opened status, and acquiring, by the second optical detector, the light intensity image distribution information $I_{mn}^{image}(p)$ of the object to be detected.

The testing method described above has the following operation principles.

First principle: the shape information of the obstacle for the frequency plane is obtained.

In the case where the frequency plane of the 4f optical imaging system is partially occluded, if it is desirable to obtain the shape information of the obstacle for the frequency plane without destroying the 4f imaging system, a thin lens of the same focal length as the lens in the imaging system can be added at each of the front and back sides of the 4f imaging system. Two requirements need to be fulfilled. The first requirement is that the distance between the lens added at the front side of the 4f imaging system and the first lens in the 4f imaging system is equal to the sum of the focal lengths of the two lenses. The second requirement is that the distance between the lens added at the back side of the 4f imaging system and the second lens in the 4f imaging system is equal to the sum of the focal lengths of the two lenses. At this point, the last imaging position lies in the back focal plane of the last lens. As such, in this case, the lens added at the front side of the 4f imaging system and the first lens in the 4f imaging system form a new 4f imaging system. For this new 4f imaging system, as the input light source is a plane wave, i.e., the input light field $E(\iota_0) = c$, where c represents a constant and $\iota_0$ is the coordinate of any point in the input surface, the intensity of the incident light $I(\iota_0) = c^2$. After propagation of the beam, the electric field on the frequency plane of this new 4f imaging system can be expressed as $$E(l_1) = \frac{-i}{\lambda f} \int \int E(l_0) \exp\left(-i\frac{2\pi}{\lambda f} l_0 \cdot l_1\right) d^2 l_0 \qquad (1)$$

where $\iota_1$ is the coordinate of any point in the frequency plane. The frequency plane of this system is free space without occlusion. Then the output light field of this new 4f imaging system can be expressed as $$E(k) = \frac{-i}{\lambda f} \int \int E(l_1) \exp\left(-i\frac{2\pi}{\lambda f} l_1 \cdot k\right) d^2 l_1 \qquad (2)$$

where k represents the coordinate of any point in the output plane of the new 4f imaging system, which is also the frequency plane of the original 4f imaging system. According to the present invention, it is found that the equations (1) and (2) are both in the form of Fourier transform. Therefore, numerical solution can be found for the integral by using the fast Fourier transform algorithm. Besides, it is further noted in the present invention that the output field $E(k) = E(-\iota_0) = c$ and the output intensity $I(k) = I(-\iota_0)$. When the beam passes through the partially occluding obstacle, and assuming that the transmittance function of the obstacle is $t(k)$, then in the case where the lens added at the back side of the 4f imaging system and the second lens in the 4f imaging system also form a new 4f imaging system, the output light field of this system is $E(k)t(k)$. Likewise, as its frequency domain is free space, Fourier transform can be performed twice to obtain the output light field $E(r_2) = E(-k)t(-k)$, then the corresponding light intensity is $I(\iota_2) = |E(-k)t(-k)|^2 = c^2|t(-k)|^2$, where $\iota_2$ is the coordinate of any point in the output plane. Therefore, according to the present invention, it is found that the light intensity distribution of the output light is the shape information of the opening in the obstacle that is symmetrical about the origin.

Second principle: Mode-superposed composite partially coherent light is used as the incident light.

Experimental investigation has shown that for a 4f optical imaging system in which the spatial frequency plane is partially occluded by an opaque object, the output image is severely distorted in the case of highly coherent illumination, whereas as the spatial coherence of the incident light decreases, the image quality is significantly improved. To explain the principle of this effect, the present invention applies the coherent mode decomposition theory to partially coherent light. Coherent mode decomposition theory, first proposed by Wolf, is a milestone achievement in optical coherence theory. The essence of the coherent mode decomposition theory lies in that the partially coherent light field is the sum of a series of completely coherent and mutually unrelated basic modes that can be decomposed. This coherent mode decomposition theory not only assists in understanding the inherent coherence of the random light field in the present invention, but also plays an important role in practical application. In the present invention, the incident light of the 4f imaging system, i.e., the partially coherent light, is considered as superposition of a set of coherent modes that are mutually unrelated. In the present invention, it is understood that destruction of the light intensity distribution in the imaging plane is caused by the mode of the edge of the obstacle positioned in the spatial frequency plane. Therefore, the imaging problem here can be analyzed by means of completely coherent optics.

The mode decomposition of the partially coherent light field can be derived from the non-negative condition, in which the cross spectral density of the partially coherent light field can be expressed in the form of integral as:

$$W(r_1,r_2) = \iint p(v) H^*(r_1,v) H(r_2,v) d^2v \quad (3)$$

where $r_1 \equiv (x_1, y_1)$ and $r_2 \equiv (x_2, y_2)$ are position vectors of any two points in the source plane, $p(v)$ is the non-negative function of any vector $v \equiv (v_x, v_y)$, and $H(r, v)$ is any kernel function. For a Schell-model light source, the kernel function can be expressed as $$H(r,v) = \sqrt{S(r)} \exp(i\pi r \cdot v) \quad (4)$$

where $S(r) = W(r, r)$ is the spectral density of the light source. For the non-negative function $p(v)$, however, if it is desired to obtain an image with high quality and high signal-to-noise ratio, we can design the spatial coherence structure of the incident beam or the spatial distribution in the $p(v)$ function, which is Fourier transform relationship, of the spatial coherence structure of the incident light based on the shape of the obstacle in the spatial frequency plane that is obtained in advance, to reduce contribution from the mode of the edge of the obstacle positioned in the spatial frequency plane. Specifically, based on the shape of the obstacle, the $p(v)$ function is modified so that its shape fits within the opening in the obstacle, which ensures that all the modes of the incident beam can pass through the opening in the obstacle. Therefore, in the spatial frequency plane, all the modes have the transmittance function $t(k)=1$, so that perfect imaging can be achieved at the output plane.

To obtain the mode decomposition, according to the present invention, the coordinate of v is transformed into a discrete form, that is, V is written in the discrete form $\{v_{m,n}\}=\{v_{xm}, v_{yn}\}$, with m=1, 2, ..., M and n=1, 2, ..., N. Here, M and N respectively represent the number of discrete coordinates in the directions of $v_x$ and $v_y$. There are a total number M×N of discrete $\{v_{m,n}\}$. The range of the value $\{v_{m,n}\}$ depends on the spatial distribution of the function $p(v)$, which is written in the discrete form of $$p(v) = \sum_{n=1}^{N}\sum_{m=1}^{M} p(v_{nm})\delta(v-v_{nm}). \quad (5)$$

Once $p(v)$ is converted into the discrete form, the formula (5) is substituted into the formula (3), and its integral can be approximated as finite summation, that is $$W(r_1,r_2) \approx \sum_{m=1}^{M}\sum_{n=1}^{N} \alpha_{mn} \phi_{mn}^*(r_1)\phi_{mn}(r_2), \quad (6)$$

with $\alpha_{mn}=p(v_{m,n})\Delta v_x \Delta v_y$ and $\phi_{mn}(r)=H(r, v_{m,n})$, in which $\Delta v_x$ and $\Delta v_y$ are the intervals between two adjacent discrete coordinates in the directions $v_x$ and $v_y$. The equation (5) is the mode decomposition of the partially coherent light field, where $\phi_{mn}(r)$ and $\alpha_{mn}$ are respectively the mode and its corresponding modal weight. It can be derived from $$W(r_1,r_2) \approx \sum_{m=1}^{M}\sum_{n=1}^{N} T_{mn}^*(r_1,\varphi)T_{mn}(r_2,\varphi),$$

and the hologram loaded by the spatial light modulator can be expressed as $$T_{nm}(r,\varphi) = \sum_{m=1}^{M}\sum_{n=1}^{N} \sqrt{\alpha_{mn}} \phi_{mn}(r,v_n)\exp(i\varphi_{mn}), \quad (7)$$

where $\varphi$ represents the random phase and has a value in the range of $[0, 2\pi]$.

Third principle: light field transmission in the 4f optical imaging system.

In the 4f imaging system, now the imaging problem with partially coherent light illumination has been reduced to the problem of mode propagation. For the propagation of a mode of the order (m, n) through the 4f imaging system, the light field in the spatial frequency plane, i.e., the back focal plane of the first thin lens, can be written as $$\psi_{mn}(k) = \frac{-i}{\lambda f} \iint O(r)\phi_{mn}(r)\exp\left(-i\frac{2\pi}{\lambda f}r\cdot k\right)d^2r, \quad (8)$$

where $k \equiv (k_x, k_y)$ represents the position vector in the spatial frequency plane, and $O(r)$ is the transmittance function of the object. In the present invention, it is assumed that the obstacle having the transmittance function $t(k)$ is placed in the spatial frequency plane, partially occluding the light field. Therefore, after the light field has passed through the obstacle, the transmitted light field can be expressed as $t(k)\psi_{mn}(k)$. After passing through the second thin lens in the 4f imaging system, the light field in the imaging plane can be expressed as $$\phi_{mn}^{image}(\rho) = \frac{-i}{\lambda f} \iint t(k)\psi_{mn}(k)\exp\left(-i\frac{2\pi}{\lambda f}k\cdot \rho\right)d^2k, \quad (9)$$

where $\rho \equiv (p_x, p_y)$ is the transversal position vector in the output imaging plane.

In the present invention, both equations (7) and (8) are in the form of Fourier transform. Therefore, numerical solution can be found for the integral by a fast Fourier transform algorithm. Besides, in the present invention, it is further noted that when t(k)=1, the output field is $\phi_{mn}^{image}(p)=O(-p)\phi_{mn}(-p)$ and the output intensity is $I_{mn}^{image}(p)=|O(-p)|^2 S(-p)$. Beside, in the experiment in the present invention, the spectral density S(p) is relatively uniform inside the object area. Therefore, for t(k)=1, the intensity in the output plane is $I_{mn}^{image}(p)=|O(-p)|^2$, indicating a perfect image on the output plane in the 4f optical system when the mode goes completely through the spatial frequency plane. However, the transmittance function t(k) for the obstacle is not uniform for all the positions k in the spatial frequency plane, and t(k)=1 applies only to the open area of the obstacle. By regulating $v_{m,n}$, in the present invention, the position of the mode in the spatial frequency plane can be adjusted. When the mode lies in the area where t(k)=1, the output field will form a perfect image of the input object. When the mode lies outside the open area of the obstacle (i.e., t(k)=0), the output field will be completely dark. Otherwise, when the mode is positioned at the edge of the obstacle, that is, when it is partially occluded by the obstacle, the output field will be distorted and cannot be clearly identified.

In another embodiment, the present invention discloses an optical imaging method regulated based on a spatial coherence structure, including the following steps.

First step: building a 4f imaging system, in which an obstacle is positioned on a spectrum plane of the 4f imaging system so that the spectrum plane of the 4f imaging system is partially occluded, an opening being provided in the obstacle and extending through the obstacle.

Second step: detecting, by a first optical detector, the shape of the spectrum domain obstacle in the 4f imaging system.

Third step: designing a spatial coherence structure of the incident beam based on the shape of the spectrum domain obstacle in the 4f imaging system, so that all the modes of the incident beam can pass through the opening in the obstacle.

Fourth step: allowing an object to be detected in the optical path and detecting, by a second optical detector, the optical imaging information of the object to be detected.

The embodiments described above are only preferred embodiments for full explanation of the present invention, and the scope of protection of the present invention is not limited thereto. Equivalent substitutions or variations made by those skilled in the art based on the present invention shall fall within the protection scope of the present invention.

What is claimed is:

1. An optical imaging system regulated based on a spatial coherence structure, comprising:
    a light source assembly including a laser and a first beam split element, the first beam split element splitting a beam emitted from the laser into a first beam and a second beam;
    an obstacle optical assembly including a first lens and a second lens, the first lens being positioned at a front side of an obstacle and the second lens being positioned at a back side of the obstacle, in which the first lens and the second lens form a 4f imaging system;
    an adjustable optical assembly positioned at a front side of an object to be detected, the adjustable optical assembly including a first shading element and a spatial light modulator that are sequentially arranged, the first beam passing through the first shading element and the spatial light modulator and then entering the obstacle optical assembly;
    a front optical assembly including a second shading element and a third lens, the second beam passing sequentially through the second shading element and the third lens, and then entering the obstacle optical assembly, the third lens and the first lens forming a 4f imaging system;
    a first optical detection assembly configured to detect optical imaging information of the obstacle and positioned in an image space of the obstacle optical assembly, the first optical detection assembly including a fourth lens and a first optical detector, the fourth lens being positioned at a front side of the first optical detector, the second lens and the fourth lens forming a 4f imaging system;
    a second optical detection assembly configured to detect optical imaging information of the object to be detected and positioned in an image space of the obstacle optical assembly, the second optical detection assembly including a second optical detector; and
    a computer connected to the first optical detector and the spatial light modulator, the first optical detector sending the optical information of the obstacle to the computer which, based on the optical information of the obstacle, adjusts the spatial light modulator to allow the second beam to pass through an opening in the obstacle.

2. The optical imaging system regulated based on a spatial coherence structure of claim 1, wherein the first optical detector and/or the second optical detector is a beam profiler.

3. The optical imaging system regulated based on a spatial coherence structure of claim 1, wherein the first shading element and/or the second shading element is a light diaphragm.

4. The optical imaging system regulated based on a spatial coherence structure of claim 1, wherein the light source assembly further includes a beam expander positioned between the laser and the first beam split element.

5. The optical imaging system regulated based on a spatial coherence structure of claim 1, wherein the first beam split element is a first beam splitter.

6. The optical imaging system regulated based on a spatial coherence structure of claim 1, wherein the optical imaging system further comprises a second beam splitter positioned between the object to be detected and the first lens, a beam exiting the third lens is reflected by the second beam splitter and enters the obstacle optical assembly.

7. The optical imaging system regulated based on a spatial coherence structure of claim 1, wherein a third beam splitter is provided at a rear end of the second lens, the second optical detector being positioned on a first illuminating surface of the third beam splitter and the fourth lens being positioned on a second illuminating surface of the third beam splitter.

8. The optical imaging system regulated based on a spatial coherence structure of claim 1, wherein the light emitted from the laser is completely coherent linearly polarized light.

9. An optical imaging method regulated based on a spatial coherence structure, using the optical imaging system of claim 1, comprising steps of:
    S1: allowing the first shading element in a shading status and the second shading element in an opened status, and detecting, by the first optical detector, the light intensity image distribution $I(\iota_2)$ of the spectrum domain obstacle, where $\iota_2$ is the coordinate of any point in the output plane;

S2: acquiring the light intensity image distribution $I(\iota_2)$ of the spectrum domain obstacle and designing a spatial distribution in a function $p(v)$, which is Fourier transform relationship, of the incident light spatial coherence structure by the computer; in which the shape of an opening in the obstacle is obtained based on the light intensity image distribution $I(\iota_2)$ of the spectrum domain obstacle, and the function $p(v)$ is modified based on the shape of the opening in the obstacle so that all modes of the incident beam can pass through the opening in the obstacle, $p(V)$ being a non-negative function of any vector $V \equiv (v_x, v_y)$;

S3: obtaining a cross spectral density $W(r_1, r_2)$ of the incident light based on the function $p(V)$ and consequently obtaining a light field $T_{mn}(r, \varphi)$ loaded by the spatial light modulator, where $r \equiv (x, y)$ represents any position vector in the source plane, $r_1 \equiv (x_1, y_1)$ and $r_2 \equiv (x_2, y_2)$ are the position vectors of any two points in the source plane, and $\varphi$ represents a random phase having a value in the range of $[0, 2\pi]$; and S4: allowing the second shading element in a shading status and the first shading element in an opened status, and acquiring, by the second optical detector, the light intensity image distribution information of the object to be detected.

10. An optical imaging method regulated based on a spatial coherence structure, comprising steps of:

building a 4f imaging system, in which an obstacle is positioned on a spectrum plane of the 4f imaging system so that the spectrum plane of the 4f imaging system is partially occluded, an opening being provided in the obstacle and extending through the obstacle;

detecting, by a first optical detector, the shape of the spectrum domain obstacle in the 4f imaging system;

designing a spatial coherence structure of the incident beam based on the shape of the spectrum domain obstacle in the 4f imaging system, so that all the modes of the incident beam can pass through the opening of the obstacle; and placing an object to be detected in the optical path, and detecting, by the second optical detector, the optical imaging information of the object to be detected.

* * * * *